(12) United States Patent
Mcgloin et al.

(10) Patent No.: US 12,556,894 B2
(45) Date of Patent: Feb. 17, 2026

(54) SENSOR PROCESSING OFFLOAD AND FUSION

(71) Applicant: QUALCOMM Incorporated, San Diego, CA (US)

(72) Inventors: Justin Mcgloin, Los Altos, CA (US); Joel Linsky, San Diego, CA (US); Ziad Asghar, San Diego, CA (US); Vinesh Sukumar, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 18/181,244

(22) Filed: Mar. 9, 2023

(65) Prior Publication Data

US 2024/0305962 A1    Sep. 12, 2024

(51) Int. Cl.
*H04W 4/38* (2018.01)
*G16Y 40/10* (2020.01)
*H04W 4/029* (2018.01)

(52) U.S. Cl.
CPC .............. *H04W 4/38* (2018.02); *G16Y 40/10* (2020.01); *H04W 4/029* (2018.02)

(58) Field of Classification Search
CPC ........ H04W 4/38; H04W 4/029; G16Y 40/10; H04L 67/04; H04L 67/12
See application file for complete search history.

(56) References Cited

U.S. PATENT DOCUMENTS

2016/0064955 A1* 3/2016 Zuerner ............... G06Q 20/321
                                                              320/107
2019/0319793 A1* 10/2019 Schooler ............... H04W 12/06

FOREIGN PATENT DOCUMENTS

CN       107408062 A       11/2017
EP       3092463 A2 *      11/2016   .............. A61B 5/24
EP       3092463 B1        5/2022

OTHER PUBLICATIONS

International Search Report and Written Opinion—PCT/US2024/011504—ISA/EPO—May 24, 2024.

* cited by examiner

*Primary Examiner* — Cheikh T Ndiaye
(74) *Attorney, Agent, or Firm* — QUALCOMM Incorporated

(57) ABSTRACT receiving, by a control system, client device information from one or more client devices and transmitting, by the control system, sensor data request information to the one or more client devices. The client device information may indicate at least client device type information and client device sensor information. The sensor data request information may indicate one or more requested sensor data types and one or more requested sensor data transmission parameters. The one or more requested sensor data transmission parameters may indicate one or more threshold parameters for requested sensor data transmission, one or more variance parameters for requested sensor data transmission, or a combination thereof. Some examples may involve receiving, by the control system, sensor data from the one or more client devices based, at least in part, on the one or more requested sensor data transmission parameters.

30 Claims, 4 Drawing Sheets

SENSOR PROCESSING OFFLOAD AND FUSION

TECHNICAL FIELD

This disclosure relates generally to devices that include sensors, systems that include such devices and related methods.

DESCRIPTION OF RELATED TECHNOLOGY

A variety of different sensing technologies and algorithms are being implemented in devices for various applications, including but not limited to Internet of Things (IoT) applications, smart home applications, vehicle-related applications, extended reality (XR) applications, biometric and biomedical applications, etc. This push is partly a result of consumer demand for continuous, noninvasive and ambulatory health and wellness monitoring. Some of these devices, as well as other devices that include sensors, may have limited processing capabilities, limited battery power, or both. Although some previously-deployed devices and systems can provide acceptable results for particular contexts and use cases, improved methods, devices and systems would be desirable.

SUMMARY

The systems, methods and devices of this disclosure each have several aspects, no single one of which is solely responsible for the desirable attributes disclosed herein.

One innovative aspect of the subject matter described in this disclosure can be implemented in an apparatus or a system. According to some implementations, an apparatus may include an interface system and a control system. The interface system may include one or more interfaces configured for wireless communication with other devices. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some implementations, an apparatus may be a server, or may provide at least some server functionality. In some implementations, a mobile device (such as a wearable device, a cellular telephone, etc.) may be, or may include, at least part of the apparatus or system.

According to some examples, the control system may be configured to receive client device information from one or more client devices. The client device information may indicate at least client device type information and client device sensor information. In some examples, the control system may be configured to transmit sensor data request information to the one or more client devices. The sensor data request information may indicate at least one or more requested sensor data types and one or more requested sensor data transmission parameters. The one or more requested sensor data transmission parameters may indicate one or more threshold parameters for requested sensor data transmission, one or more variance parameters for requested sensor data transmission, or a combination thereof. According to some examples, the control system may be configured to receive sensor data from the one or more client devices based, at least in part, on the one or more requested sensor data transmission parameters.

In some examples, the one or more requested sensor data transmission parameters may include one or more time-based parameters, one or more event-based parameters, or a combination thereof. According to some examples, the one or more requested sensor data transmission parameters may include one or more parameters corresponding to one or more client device battery states. In some examples, the one or more requested sensor data transmission parameters may include parameters for reduction of client device sensor data transmission corresponding to a client device battery state that is at or below a battery state threshold. According to some examples, the one or more requested sensor data transmission parameters may include parameters for cessation of client device sensor data transmission corresponding to a client device battery state that is at or below a battery state threshold. In some examples, the one or more requested sensor data transmission parameters may include one or more parameters involving a motion of a client device, an orientation of the client device, a position of the client device, whether the client device is being worn by a person, whether the client device is being carried by a person, or combinations thereof.

According to some examples, the control system may be configured to receive one or more sensor data transmission parameters, one or more battery state parameters, or a combination thereof, from the one or more client devices.

In some examples, the one or more client devices may be a single client device. In some such examples, the control system may be configured to provide offload processing responsive to an offload processing request received from the single client device. In some examples, the one or more client devices may include at least two client devices. In some such examples, the sensor data may be received from the at least two client devices.

According to some examples, the control system may be configured to interpret first sensor data received from a first client device based, at least in part, on second sensor data received from a second client device. In some examples, the control system may be configured to estimate a usage context of the first client device based, at least in part, on the second sensor data. According to some examples, the usage context may involve an indoor context, an outdoor context, an urban context, a driving context, an activity context, an in-vehicle context, an ambient noise context, a human presence context, a location context, a speed context, a direction of motion context, an orientation context, an emergency context, or combinations thereof. In some examples, the usage context may involve an activity context and wherein the activity context may involve a walking context, a running context, a hiking context, a cycling context, a stair climbing context, a swimming context, a sports context, a communication context, or combinations thereof. According to some examples, the usage context may involve a communication context and wherein the communication context may involve an in-person talking context, an audio telephone call context, a video telephone call context, a texting context, a teleconferencing context, or combinations thereof.

In some examples, the control system may be configured to estimate the usage context of the first client device based, at least in part, on first sensor data received from the first client device. According to some examples, the second sensor data may include location data, microphone data, temperature data, inertial sensor data, wireless signal type data, magnetometer data, cardiac data, respiratory data, or combinations thereof.

According to some examples, the control system may be configured to control the first client device based, at least in part, on sensor data received from a second client device. In some examples, the control system may be configured to control an audio mode of the first device based, at least in part, on the sensor data received from the second client device.

In some examples, the control system may be configured to determine whether first sensor data received from a first client device is more accurate than second sensor data received from a second client device. According to some examples, the control system may be configured to send calibration data to the second client device responsive to determining that the first sensor data is more accurate than the second sensor data received from a second client device.

According to some examples, the control system may be configured to combine first sensor data received from a first client device with second sensor data received from a second client device. In some examples, the control system may be configured to estimate one or more cardiac parameters based on the sensor data from the one or more client devices.

Other innovative aspects of the subject matter described in this disclosure can be implemented in a method. The method may involve receiving, by a control system, client device information from one or more client devices. The client device information may indicate at least client device type information and client device sensor information. The method may involve transmitting, by the control system, sensor data request information to the one or more client devices. In some examples, the sensor data request information may indicate at least one or more requested sensor data types and one or more requested sensor data transmission parameters. The one or more requested sensor data transmission parameters may indicate one or more threshold parameters for requested sensor data transmission, one or more variance parameters for requested sensor data transmission, or a combination thereof. The method may involve receiving, by the control system, sensor data from the one or more client devices based, at least in part, on the one or more requested sensor data transmission parameters.

In some examples, the one or more requested sensor data transmission parameters may include one or more time-based parameters, one or more event-based parameters, or a combination thereof. According to some examples, the one or more requested sensor data transmission parameters may include one or more parameters corresponding to one or more client device battery states. In some examples, the one or more requested sensor data transmission parameters may include parameters for reduction of client device sensor data transmission corresponding to a client device battery state that is at or below a battery state threshold. According to some examples, the one or more requested sensor data transmission parameters may include parameters for cessation of client device sensor data transmission corresponding to a client device battery state that is at or below a battery state threshold.

Some or all of the methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon. The software may include instructions for controlling one or more devices to perform one or more disclosed methods.

According to some such examples, the method may involve receiving, by a control system, client device information from one or more client devices. The client device information may indicate at least client device type information and client device sensor information. The method may involve transmitting, by the control system, sensor data request information to the one or more client devices. In some examples, the sensor data request information may indicate at least one or more requested sensor data types and one or more requested sensor data transmission parameters. The one or more requested sensor data transmission parameters may indicate one or more threshold parameters for requested sensor data transmission, one or more variance parameters for requested sensor data transmission, or a combination thereof. The method may involve receiving, by the control system, sensor data from the one or more client devices based, at least in part, on the one or more requested sensor data transmission parameters.

In some examples, the one or more requested sensor data transmission parameters may include one or more time-based parameters, one or more event-based parameters, or a combination thereof. According to some examples, the one or more requested sensor data transmission parameters may include one or more parameters corresponding to one or more client device battery states. In some examples, the one or more requested sensor data transmission parameters may include parameters for reduction of client device sensor data transmission corresponding to a client device battery state that is at or below a battery state threshold. According to some examples, the one or more requested sensor data transmission parameters may include parameters for cessation of client device sensor data transmission corresponding to a client device battery state that is at or below a battery state threshold.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
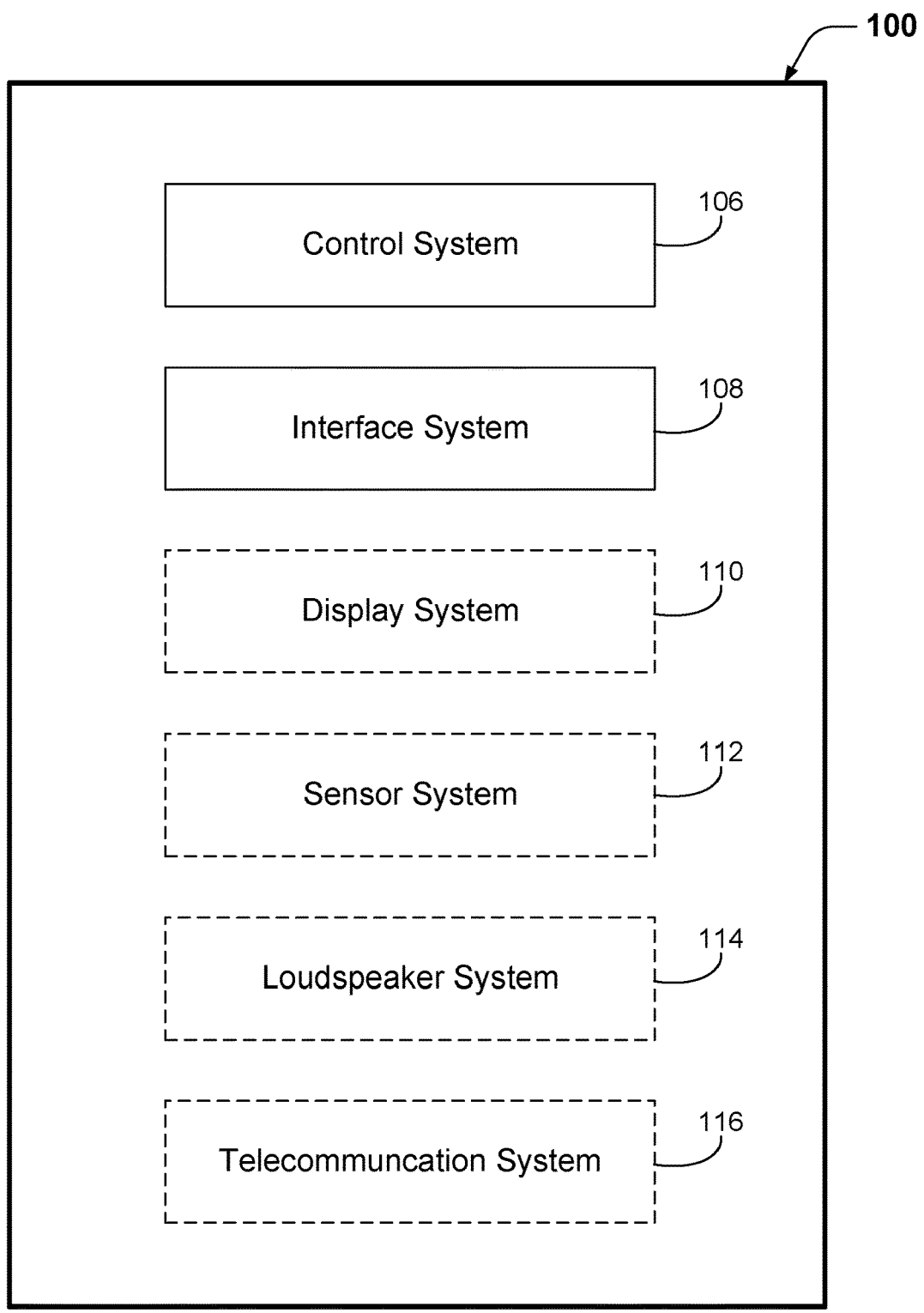
FIG. 1 is a block diagram that shows example components of an apparatus according to some disclosed implementations.

The following description is directed to certain implementations for the purposes of describing various aspects of this disclosure. However, a person having ordinary skill in the art will readily recognize that the teachings herein can be applied in a multitude of different ways. Some of the concepts and examples provided in this disclosure are especially applicable to blood pressure monitoring applications. However, some implementations also may be applicable to other types of biological sensing applications, as well as to other fluid flow systems. The described implementations may be implemented in any device, apparatus, or system that includes an apparatus as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, handheld or portable computers, netbooks, notebooks, smartbooks, tablets, printers, copiers, scanners, facsimile devices, global positioning system (GPS) receivers/navigators, cameras, digital media players, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), architectural structures, microwaves, refrigerators, stereo systems, cassette recorders or players, DVD players, CD players, VCRs, radios, portable memory chips, washers, dryers, washer/dryers, parking meters, automobile doors, autonomous or semi-autonomous vehicles, drones, Internet of Things (IoT) devices, etc. Thus, the teachings are not intended to be limited to the specific implementations depicted and described with reference to the drawings; rather, the teachings have wide applicability as will be readily apparent to persons having ordinary skill in the art.

Due to a combination of cost, form factor size and battery life, many sensor-equipped devices have limitations in their capabilities. For example, some sensor-equipped devices may not include sensor types that are required to implement features of interest. Some sensor-equipped devices may not be capable of executing sophisticated algorithms—such as algorithms for implementing health monitoring functionality—for an extended period of time. Some sensor-equipped devices may not be capable of using sensor data from other devices, such as other sensor-equipped devices in close proximity.

Some disclosed systems may include one or more client devices and one or more devices configured to provide at least some server functionality, which may be referred to herein as "servers," "server devices," etc. The one or more client devices may include sensor-equipped devices such as smart watches, fitness bands, earbuds, headphones, patches or other body-worn sensors, etc. The one or more server devices may be, or may include, one or more laptops, cell phones, tablet devices, etc. In some instances, the same device may function as both a client device and a server device. For example, the same device may function as a client device regarding one or more services, one or more other devices, or combinations thereof, and may function as a server device regarding one or more other services, one or more other devices, or combinations thereof. Some disclosed server devices may include a control system and an interface system configured for wireless communication with one or more other devices. In some examples, the control system may be configured to receive client device information from one or more client devices. The client device information may indicate client device type information and client device sensor information.

In some examples, the control system of a server device may be configured to transmit sensor data request information to the one or more client devices. The sensor data request information may indicate at least one or more requested sensor data types and one or more requested sensor data transmission parameters. The one or more requested sensor data transmission parameters may indicate one or more threshold parameters for requested sensor data transmission, one or more variance parameters for requested sensor data transmission, or a combination thereof. According to some examples, the control system of a server device may be configured to receive sensor data from the one or more client devices based, at least in part, on the one or more requested sensor data transmission parameters. In some examples, the one or more requested sensor data transmission parameters may include one or more time-based parameters, one or more event-based parameters, one or more parameters corresponding to a client device battery state, or combinations thereof.

Particular implementations of the subject matter described in this disclosure can be implemented to realize one or more of the following potential advantages. Some implementations may use connectivity between devices to leverage higher-capability server devices, to process sensor data from one or more lower-capability "client" devices. In some implementations, the server devices may return context information, event information, etc., to one or more of the client devices. According to some implementations, sensor data from multiple devices may be combined, or "fused," for example to create more accurate contextual information. In some implementations, a client device having a relatively low-capacity battery may prolong battery life by offloading one or more tasks, such as one or more processing tasks, to a server device. According to some implementations, overall system power consumption may be reduced or limited by implementing sensor data transmission parameters—such as change detection parameters—thereby limiting the amount of sensor data transmitted between client and server devices. The change detection parameters may, for example, include one or more time-based parameters, one or more event-based parameters, one or more parameters corresponding to a client device battery state, or combinations thereof.

FIG. 1 is a block diagram that shows example components of an apparatus according to some disclosed implementations. As with other figures provided herein, the numbers, types and arrangements of elements shown in FIG. 1 are merely presented by way of example. Other implementations may include other numbers of elements, types of elements, arrangements of elements, or combinations thereof.

In this example, the apparatus 100 includes at least a control system 106 and an interface system 108. Some implementations of the apparatus 100 may include a display system 110, a sensor system 112, a loudspeaker system 114, a telecommunication system 116, or combinations thereof.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 100 may have a memory system that includes one or more memory devices, though the memory system is not shown in FIG. 1.

If the apparatus 100 includes a display system 110, the control system 106 may be configured for controlling the display system 110. If the apparatus 100 includes a sensor system 112, the control system 106 may be configured for controlling the sensor system 112. In some examples, the control system 106 may be configured for receiving and processing data from the sensor system 112, if present, for receiving and processing data from a sensor system of one or more other devices, or combinations thereof. According to some examples, the control system 106 may be configured for estimating one or more metrics, such as location metrics, distance metrics, speed or velocity metrics, light intensity—such as ambient light intensity—barometric pressure, magnetic field strength, temperature, humidity, etc., based on the data from the sensor system 112, if present, based on data from a sensor system of one or more other devices, or combinations thereof. In some examples, the control system 106 may be configured to estimate one or more biological metrics, such as calorie consumption metrics, blood oxygen metrics, cardiac-related metrics, etc., based on the data from the sensor system 112, if present, based on data from a sensor system of one or more other devices, or combinations thereof. The control system may be configured for controlling one or more elements of the interface system 108, such as one or more elements of a user interface system. If the apparatus 100 includes a loudspeaker system 114, the control system 106 may be configured for controlling the loudspeaker system 114. If the apparatus 100 includes a telecommunications system 116, the control system 106 may be configured for controlling the telecommunications system 116. In some implementations, functionality of the control system 106 may be partitioned between one or more controllers or processors, such as a dedicated display system controller, a dedicated sensor system controller, a dedicated telecommunications system controller and one or more applications processors.

According to some examples, the control system 106 may be configured to transmit sensor data request information to one or more client devices. The sensor data request information may indicate at least one or more requested sensor data types and one or more requested sensor data transmission parameters. The one or more requested sensor data transmission parameters may indicate one or more threshold parameters for requested sensor data transmission, one or more variance parameters for requested sensor data transmission, or a combination thereof. According to some examples, the control system of a server device may be configured to receive sensor data from the one or more client devices based, at least in part, on the one or more requested sensor data transmission parameters. In some examples, the one or more requested sensor data transmission parameters may include one or more time-based parameters, one or more event-based parameters, one or more parameters corresponding to a client device battery state, or combinations thereof.

In some examples, the interface system 108 may include a wireless interface system, including one or more interfaces configured for wireless communication with other devices. The other devices may be, or may include, one or more server devices, one or more client devices, or combinations thereof.

In some implementations, the interface system 108 may include a user interface system, one or more network interfaces, one or more interfaces between the control system 106 and a memory system, one or more interfaces between the control system 106 and the sensor system 112, if present, one or more interfaces between the control system 106 and the loudspeaker system 114, if present, one or more interfaces between the control system 106 and one or more external device interfaces (e.g., ports or applications processors), or combinations thereof.

According to some examples, the user interface system may include the optional loudspeaker system 114. In some examples, the user interface system may include one or more elements of the optional display system 110, the optional sensor system 112, other elements, or combinations thereof. Accordingly, although the interface system 108, the optional display system 110 and the optional sensor system 112 are shown as separate blocks in FIG. 1, in some implementations these elements may all be considered to be part of the interface system 108. In some examples, the user interface system may include a microphone system, a haptic feedback system, a voice command system, one or more displays, a touch sensor system, a gesture sensor system, a force sensor system, an optical sensor system, one or more cameras, or combinations thereof.

The display system 110, if present, may include one or more displays. For example, the display system 110 may include one or more LED displays, such as one or more organic LED (OLED) displays.

In some examples, the sensor system 112 may include an inertial sensor system, a magnetometer system, a temperature sensor system, a microphone system, a touch sensor system, a gesture sensor system, a force sensor system, an optical sensor system, one or more cameras, an ultrasonic sensor system, a microphone system, a humidity detection system, a radio frequency (RF) sensor system, a radar system—which may be, or which may include, a frequency-modulated continuous wave (FMCW) radar system—a photoplethysmography (PPG) system, a photoacoustic plethysmography (PAPG) system, an electrocardiogram (ECG) system, or combinations thereof. The inertial sensor system—if present—may include an accelerometer system, a gyroscope system, or combinations thereof. The microphone system—if present—may include one or more microphones. The touch sensor system—if present—may be, or may include, a resistive touch sensor system, a surface capacitive touch sensor system, a projected capacitive touch sensor system, a surface acoustic wave touch sensor system, an infrared touch sensor system, any other suitable type of touch sensor system, or combinations thereof. The force sensor system—if present—may be, or may include, a piezo-resistive sensor, a capacitive sensor, a thin film sensor (for example, a polymer-based thin film sensor), another type of suitable force sensor, or combinations thereof. If the force sensor system includes a piezo-resistive sensor, the piezo-resistive sensor may include silicon, metal, polysilicon, glass, or combinations thereof.

The ultrasonic sensor system—if present—may include an ultrasonic receiver system. In some implementations that include an ultrasonic receiver system, the ultrasonic receiver and an ultrasonic transmitter may be combined in an ultrasonic transceiver. In some examples, the ultrasonic receiver system may include a piezoelectric receiver layer, such as a layer of PVDF polymer or a layer of PVDF-TrFE copolymer. In some implementations, a single piezoelectric layer may serve as an ultrasonic receiver. In some implementations, other piezoelectric materials may be used in the piezoelectric layer, such as aluminum nitride (AlN) or lead zirconate titanate (PZT). The ultrasonic receiver system may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers. According to some examples, the ultrasonic receiver system may be, or may include, an ultrasonic receiver array. In some examples, the apparatus 100 may include one or more separate ultrasonic transmitter elements. In some such examples, the ultrasonic transmitter(s) may include an ultrasonic plane-wave generator.

In some implementations, the sensor system 112 may include a light source system. The light source system—if present—may, in some examples, include one or more light-emitting diodes. In some implementations, the light source system may include one or more laser diodes. According to some implementations, the light source system may include one or more vertical-cavity surface-emitting lasers (VCSELs). In some implementations, the light source system may include one or more edge-emitting lasers. In some implementations, the light source system may include one or more neodymium-doped yttrium aluminum garnet (Nd:YAG) lasers. According to some implementations, the light source system may include a light detection and ranging (LIDAR) system, which may be, or may include, a steerable time of flight ToF system.

The light source system may, in some examples, be configured to transmit light in one or more wavelength ranges. In some examples, the light source system may be configured for transmitting light in a wavelength range of 500 to 600 nanometers. According to some examples, the light source system may be configured for transmitting light in a wavelength range of 800 to 950 nanometers.

The light source system may include various types of drive circuitry, depending on the particular implementation. In some disclosed implementations, the light source system may include at least one multi-junction laser diode, which may produce less noise than single-junction laser diodes. In some examples, the light source system may include a drive circuit (also referred to herein as drive circuitry) configured to cause the light source system to emit pulses of light at pulse widths in a range from 1 nanoseconds to 1000 nanoseconds. According to some examples, the light source system may include a drive circuit configured to cause the light source system to emit pulses of light at pulse repetition frequencies in a range from 1 kilohertz to 100 kilohertz.

In some examples, the control system 106 may be configured to control the light source system to emit light towards a target object on an outer surface of the apparatus 100. In some such examples, the control system 106 may be configured to receive signals from an ultrasonic receiver system corresponding to the ultrasonic waves generated by an ultrasonic transmitter and reflected from a target object or ultrasonic waves generated by the target object responsive to the light from the light source system. In some examples, the control system 106 may be configured to identify one or more blood vessel signals, such as arterial signals or vein signals, from the ultrasonic receiver system. In some such examples, the one or more arterial signals or vein signals may be, or may include, one or more blood vessel wall signals corresponding to ultrasonic waves generated by one or more arterial walls or vein walls of the target object. In some such examples, the one or more arterial signals or vein signals may be, or may include, one or more arterial blood signals corresponding to ultrasonic waves generated by blood within an artery of the target object or one or more vein blood signals corresponding to ultrasonic waves generated by blood within a vein of the target object. In some examples, the control system 106 may be configured to estimate one or more cardiac features based, at least in part, on one or more arterial signals, on one or more vein signals, or on combinations thereof. According to some examples, the cardiac features may be, or may include, blood pressure.

The loudspeaker system 114, if present, may include one or more loudspeakers. In some examples, the apparatus 100 may be, or may include, earbuds, headphones, etc., which may include one or more elements of the loudspeaker system 114.

The telecommunication system 116, if present, may include one or more antennas, etc. In some examples, at least a portion of the control system 106 may be configured to control the telecommunication system 116, if present, to provide cellular telephone functionality.

The apparatus 100 may be used in a variety of different contexts, many examples of which are disclosed herein. For example, in some implementations a mobile device may include the apparatus 100. In some such examples, the mobile device may be a smart phone, an Internet of things (IoT) device, an automobile or a component thereof, extended reality glasses, etc. In some implementations, a wearable device may include the apparatus 100. The wearable device may, for example, be a bracelet, an armband, a wristband, a watch, a ring, a headband or a patch.

Figure 2:
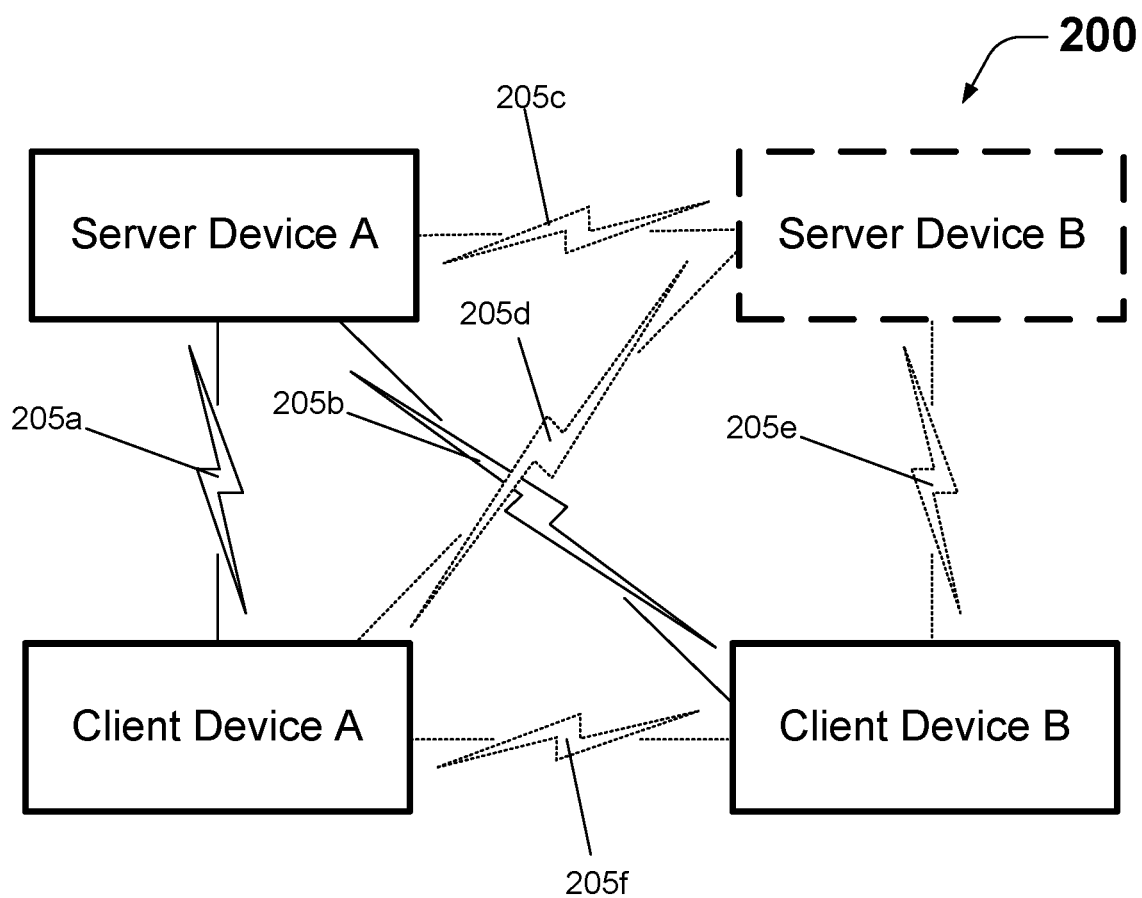
FIG. 2 is a block diagram that shows example components of a system according to some disclosed implementations.

FIG. 2 is a block diagram that shows example components of a system according to some disclosed implementations. As with other figures provided herein, the numbers, types and arrangements of elements shown in FIG. 2 are merely presented by way of example. Other implementations may include other numbers of elements, types of elements, arrangements of elements, or combinations thereof. For example, although many disclosed implementations may involve client devices owned and controlled by a single person, in some alternative implementations a server device being used by person A may receive sensor data not only from one or more client devices being used by person A, but also from one or more client devices being used by person B, person C, etc. For example, persons A, B and C may be members of a hiking group, a cross-country team, or another such group of individuals who have enabled the sharing of sensor data acquired by their client device(s) with a server device being used by one or more other people's client device(s).

In this example, the system 200 includes at least one server device, the server device A. In some alternative examples, the system 200 may include the optional server device B, which is shown in a dashed outline in FIG. 2, or additional server devices. The server devices A and B may be, or may include, one or more laptops, cell phones, tablet devices, etc.

According to this example, the system 200 includes at least client device A and client device B. In some alternative examples, the system 200 may include only one client device or more than two client devices. The client device A and client device B may include one or more types of sensor-equipped devices such as one or more watches, fitness bands, earbuds, headphones, patches or other body-worn sensor-equipped devices, etc. In these examples, the server devices and the client devices shown in FIG. 2, as well as the server devices and the client devices described as alternative examples, are instances of the apparatus 100 of FIG. 1.

In this example, wireless communication links 205a and 205b, between the server device A and the client devices A and B, respectively, are shown in FIG. 2. In some examples, a wireless communication link 205f may be established between the client device A and the client device B, if present. In implementations wherein the system 200 includes the optional server device B, wireless communication links 205d and 205e, between the server device B and the client devices A and B, respectively, may be established. In some such examples, a wireless communication link 205c may be established between the server device A and the server device B. According to some examples, at least one of the devices of system 200 may be configured for communication with one or more external devices—in other words, configured for communication with one or more devices outside of the system 200—for example via a Wi-Fi protocol, via one or more cellular telecommunication protocols, etc.

As noted elsewhere herein, many sensor-equipped client devices have limitations in their capabilities. These limitations may be caused, at least in part, by factors such as cost, form factor size, battery life, processing power, or combinations thereof. Due to processing power limitations, some sensor-equipped client devices may not be capable of executing sophisticated algorithms—such as algorithms for implementing health monitoring functionality—for an extended period of time. Moreover, some sensor-equipped client devices may not include all of the sensor types that may be required to implement features of interest.

In order to address such limitations, some disclosed implementations may use connectivity between client and server devices to leverage the relatively higher capabilities of one or more devices of the system 200 to process sensor data obtained by one or more other devices. For example, in some implementations, the relatively higher capabilities of one or more server devices of the system 200—such as the server device A—may be used to process sensor data obtained by one or more client devices. According to some implementations, sensor data from multiple devices may be combined, or "fused," for example to create more accurate contextual information. In some implementations, overall system power consumption may be reduced or limited by implementing sensor data transmission parameters—such as change detection parameters—thereby limiting the number of request and the amount of data transmitted between client and server devices. The change detection parameters may, for example, include one or more time-based parameters, one or more event-based parameters, one or more parameters corresponding to a client device battery state, or combinations thereof.

For example, a server device (such as the server device A) may process sensor data obtained by one or more client devices (such as the client device A, the client device B, or both), sensor data obtained by the server device itself, or combinations thereof. In some such examples, the server device may estimate one or more metrics, one or more contexts for such metrics, or combinations thereof. In some examples, the metric(s) may include one or more cardiac-related metrics, such as heart rate, blood pressure, etc. According to some examples, sensor data relating to heart rate information may be obtained from a client device, such as a watch or other wearable device, that includes a PPG system. In some examples, sensor data relating to blood pressure may be obtained from a client device, such as a watch or other wearable device, that includes a PPG system or a PAPG system.

In some examples, at least one of client device A or client device B may be a wearable client device, such as a patch, a watch, a fitness band, one or more earbuds, etc., configured to obtain sensor data from a person corresponding to one or more cardiac-related metrics. Such sensor data may include optical sensor data, ultrasonic sensor data, PAPG sensor data, PPG sensor data, one or more other types of sensor data, or combinations thereof. Client device A, client device B, or both, may provide the sensor data to server device A. According to some such examples, a control system of server device A may be configured to estimate one or more cardiac-related metrics.

In some examples, a control system of server device A—or of another server device—may be configured to assess one or more metrics based on contextual information. The contextual information may include information indicating an indoor context, an outdoor context, an urban context, a driving context, an activity context, an in-vehicle context, an ambient noise context, a human presence context, a location context, a speed context, a direction of motion context, an orientation context, an emergency context, or combinations thereof. The contextual information may be based, at least in part, on sensor data obtained from server device A, from client device A, from client device B, from other client or server devices, or combinations thereof. The sensor data may, for example, include microphone data, temperature data, inertial sensor data, light sensor data, or combinations thereof. In some examples, the contextual information may be based, at least in part, on location data obtained via a location-determination system, such as global positioning system (GPS) data.

In some examples, a server device may evaluate a heart rate according to an activity context, for example to determine whether the heart rate should be classified as a resting heart rate. In some such examples, previously-measured resting heart rates may be stored in a memory and compared with a current resting heart rate. In some instances, an elevated resting heart rate may correspond with pregnancy, the onset of an illness or another medical condition (such as a heart-related condition), etc. In some examples, a server device may provide a user notification, may cause a client device to provide a user notification, or both, if an elevated resting heart rate is detected. However, if the server device estimates that a person whose heart rate is being measured is walking, running, etc., the server device may determine that the heart rate should not be classified as a resting heart rate.

In some examples, if the server device determines that a person whose heart rate is being measured is driving a vehicle, the server device may determine, or estimate, that an elevated resting heart rate corresponds with driving stress. In some such examples, the server device may cause one or more driver assistance features to be enabled. Such driver assistance features may, for example, include radar-based (or other sensor-based) braking assistance, steering assistance (such as automatically keeping a vehicle within lanes of a highway or other road), etc. In some examples, the server device may cause a user interface system, such as a display system, a loudspeaker system, etc., to provide one or more prompts corresponding with an estimated driving stress condition, such as a prompt to consider taking a break from driving.

In another example, a server device may evaluate a heart rate according to a determined exercise activity context, such as a running context, a swimming context, a rowing context, etc., to determine whether the heart rate is within a desirable range. The exercise activity context may, for example, be determined (at least in part) according to inertial sensor data obtained by one or more wearable client devices, according to inertial sensor data obtained by the server device, or a combination thereof. The desirable heart rate range may, for example, depend on the age of the user. According to some sources, a maximum desirable heart rate range for moderate-intensity physical activity should be between 64% and 76% of an age-dependent maximum heart rate. The age-dependent maximum heart rate generally decreases with age. Some sources indicate that the age-dependent maximum heart rate may be estimated by subtracting a person's age from 220 to determine the maximum number of heart beats per minutes. According to some such examples, a server device (such as the server device A of FIG. 2) may cause a user interface system of the server device, a user interface system of a client device, or a combination thereof, to provide user prompts indicating whether a user's heart rate is within a desirable range.

Accordingly, in some examples, a server device may control one or more client devices according to contextual information. In some examples, a server device may control one or more loudspeaker settings of a client device, one or more microphone settings of a client device, or combinations thereof, based at least in part on contextual information. In some examples, the contextual information may be obtained, at least in part, from a device other than the client device for which microphone and/or loudspeaker settings are controlled.

For example, let us assume that client device A is, or includes, a pair of earbuds or a pair of headphones. Server device A may determine the context of client device A according to sensor data obtained from client device A (for example, via a microphone system of client device A), according to sensor data obtained from client device B (for example, sensor data obtained from a smart watch), according to sensor data obtained by server device A (for example, sensor data obtained by a smart phone), or combinations thereof. In some such examples, if server device A determines that client device A is indoors, stationary and listening to audio content provided by the loudspeaker system of client device A, server device A may cause a microphone system of client device A to operate at a relatively low setting or switched off, in order to allow a user to attend more fully to the audio content. However, if server device A determines that client device A is outdoors and in an urban environment, server device A may cause the microphone system of client device A to operate in a "pass-through" mode so that the user can hear environmental sounds as well as sounds associated with to the audio content.

According to some examples, server device A may or may not cause the user to be alerted to particular sounds, such as vehicle sounds, depending on a context determination. For example, if server device A estimates that the user is walking in an urban environment and listening to audio content provided by the loudspeaker system of client device A, server device A may cause the user to be alerted to vehicle sounds, such as by selectively controlling a microphone system of client device A, by controlling a loudspeaker system of client device A to provide an audio prompt, etc. However, if server device A estimates that the user is in an urban environment but is on a bus, a taxi or a train, server device A may not cause the user to be alerted to vehicle sounds. In another example, if server device A estimates that the user is in the user's home and listening to audio content provided by the loudspeaker system of client device A, server device A may cause the user to be alerted to a smoke alarm sound, a security system alarm sound, a doorbell sound, a crying child sound, etc.

According to some of the previously-described examples, including but not limited to those involving indoor/outdoor determinations, sensor data from multiple devices may be combined, or "fused," for example to create more accurate contextual information. For example, an indoor/outdoor determination may be based, at least in part, on location data obtained by a first device (such as GPS data obtained by the server device A), on whether or not a Wi-Fi signal greater than a threshold level is detected (for example by the server device A or the server device B), on microphone data obtained by one or more devices (such as microphone data obtained by the server device A and the client device A), on temperature data obtained by one or more devices (such as temperature data obtained from the client device A or the client device B), etc. In some examples, the devices from which sensor data will be fused are in close proximity, such as within 1 meter of one another, within 2 meters of one another, within 3 meters of one another, etc.

In another example, sleep assessment information may be obtained from multiple devices and fused during an estimated sleep context. For example, inertial sensor data from a wearable device, such as the client device B, may be combined with microphone data from a smart phone, such as the server device A, to determine when a user is snoring, whether the snoring corresponds with detected user movements, etc.

In some implementations, overall system power consumption may be reduced or limited by implementing sensor data transmission parameters—such as change detection parameters—thereby limiting the amount of data transmitted between client and server devices. The change detection parameters may, for example, include one or more time-based parameters, one or more event-based parameters, one or more parameters corresponding to a client device battery state, or combinations thereof. The change detection parameters may, in some examples, be determined by a server device (such as the server device A) and provided to one or more client devices (such as the client devices A and B). Decreasing the overall number of potential transmissions of sensor data from a client device will decrease the power used by that client device, thereby extending the time that the client device may be used between battery charging instances. Some methods involving sensor data transmission parameters are described below with reference to FIG. 3.

Figure 3:
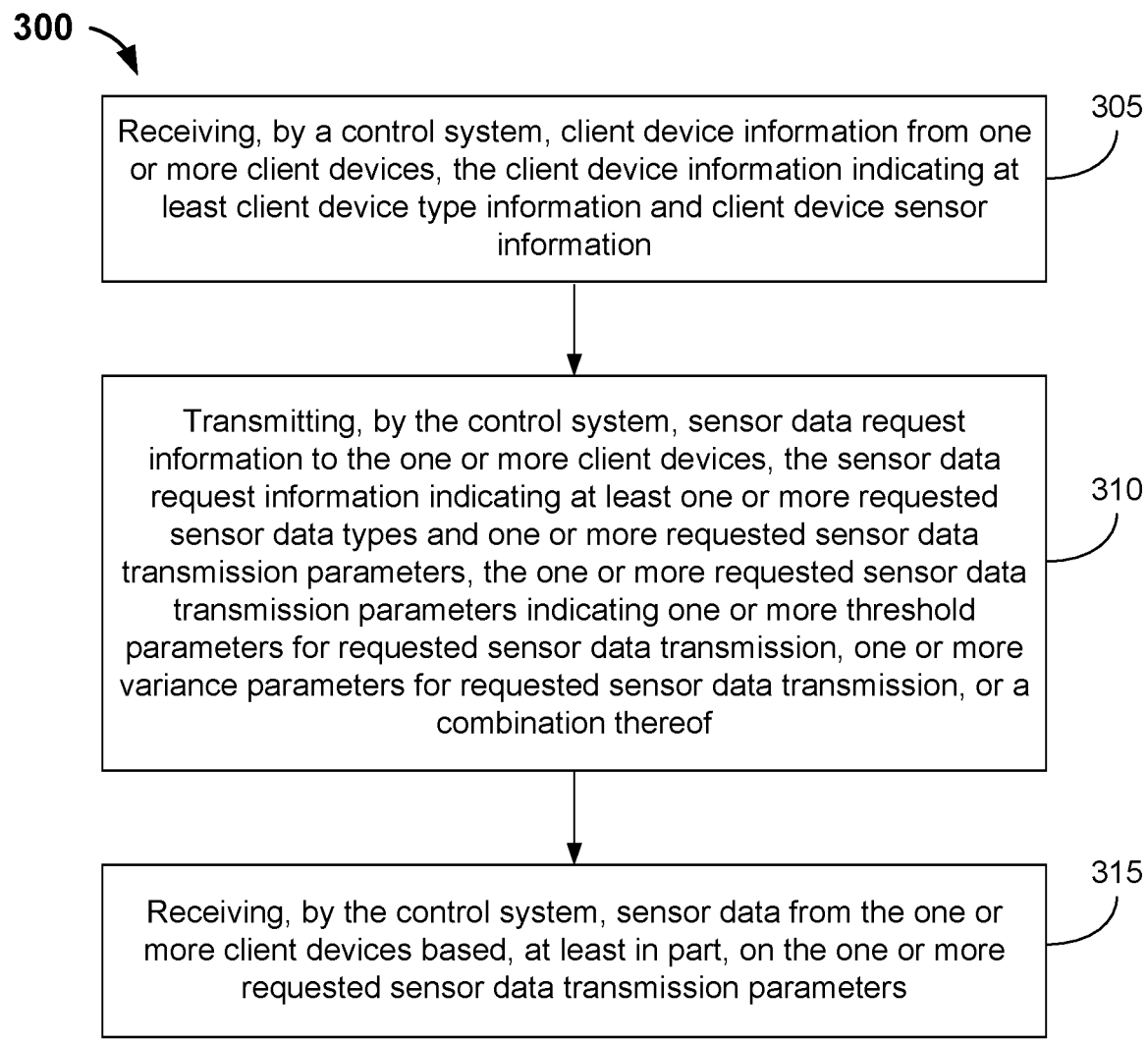
FIG. 3 is a flow diagram that shows examples of some disclosed operations.

FIG. 3 is a flow diagram that shows examples of some disclosed operations. The blocks of FIG. 3 (and those of other flow diagrams provided herein) may, for example, be performed by the apparatus 100 of FIG. 1 or by a similar apparatus. Accordingly, method 300 may be performed by an apparatus that includes at least a control system and an interface system. The interface system may include one or more interfaces configured for wireless communication with other devices. As with other methods disclosed herein, the method outlined in FIG. 3 may include more or fewer blocks than indicated. Moreover, the blocks of methods disclosed herein are not necessarily performed in the order indicated. In some instances, one or more of the blocks shown in FIG. 3 may be performed concurrently.

In this example, block 305 involves receiving, by a control system, client device information from one or more client devices. According to this example, the client device information indicates at least client device type information and client device sensor information. In one such example, the server device A of FIG. 2 may receive client device information from client device A, from client device B, or from both client devices. For example, client device A may send client device information identifying itself as a pair of headphones that includes a loudspeaker system and a microphone system. Client device B may send client device information identifying itself as a smart watch that includes a microphone system, an inertial sensor system and a PPG system.

According to this example, block 310 involves transmitting, by the control system, sensor data request information to the one or more client devices. In this example, the sensor data request information indicates at least one or more requested sensor data types and one or more requested sensor data transmission parameters. According to this example, the one or more requested sensor data transmission parameters indicate one or more threshold parameters for requested sensor data transmission, one or more variance parameters for requested sensor data transmission, or a combination thereof. In some examples, the one or more requested sensor data transmission parameters may include one or more time-based parameters, one or more event-based parameters, or a combination thereof. According to some examples, the one or more requested sensor data transmission parameters may include one or more parameters involving a motion of a client device, an orientation of the client device, a position of the client device, whether the client device is being worn by a person, whether the client device is being carried by a person, or combinations thereof.

In this example, block 315 involves receiving, by the control system, sensor data from the one or more client devices based, at least in part, on the one or more requested sensor data transmission parameters. In some examples, the control system may receive one or more sensor data transmission parameters, one or more battery state parameters, or a combination thereof, from the one or more client devices.

For example, supposing that the client device information received in block 305 indicates that client device B is a smart watch that includes a microphone system, an inertial sensor system and a PPG system, the sensor data request information transmitted to client device B may indicate requests for microphone system data, inertial sensor system data and PPG system data. The sensor data transmission parameters may, for example, indicate one or more threshold parameters for requested sensor data transmission. For example, the sensor data transmission parameters may indicate one or more threshold parameters for causing PPG system data to be transmitted from client device B to server device A, one or more threshold parameters for causing inertial sensor system data to be transmitted from client device B to server device A, etc. For example, the sensor data transmission parameters may indicate one or more acceleration threshold parameters, one or more threshold orientation change parameters, etc., that will trigger the transmission of inertial sensor data and/or other types of sensor data, such as PPG system data, microphone data, or both, from client device B to server device A. Server device A may, for example, determine and transmit such thresholds in order to respond to changes in user activity types, such the beginning of a walking state, a running state, another exercise-related state, etc., after a period during which the user was stationary. Accordingly, such thresholds are examples of what may be referred to herein as "change detection parameters." In some such examples, change detection parameters corresponding to an exercise-related state may cause client device B to send PPG system data relatively more frequently to server device A. According to one such example, client device B may send PPG system data to server device A once every 30 minutes, once per hour, once every two hours, etc., when the user is stationary, whereas change detection parameters corresponding to an exercise-related state may cause client device B to send PPG system data to server device A once per second, once every two seconds, once every five seconds, once every 10 seconds, etc.

In some examples, the one or more requested sensor data transmission parameters may include one or more parameters corresponding to one or more client device battery states. For example, the one or more requested sensor data transmission parameters may include one or more parameters for reduction of client device sensor data transmission corresponding to a client device battery state that is at or below a battery state threshold. In one such example, if client device B has a battery state that is above a battery state threshold—such as a 10% battery charge level, a 15% battery charge level, a 20% battery charge level, a 25% battery charge level, etc.—client device B may send PPG system data to server device A at a first rate when a user is in an exercise-related state. The first rate may be once per second, once every two seconds, once every five seconds, once every 10 seconds, etc. However, if client device B has a battery state that is at or below the battery state threshold, client device B may send PPG system data to server device A at a second rate when the user is in an exercise-related state. The second rate may be lower than the first rate. For example, if the first rate is once per second, the second rate may be once every two seconds, once every five seconds, once every 10 seconds, etc.

According to some examples, the one or more requested sensor data transmission parameters may include parameters for cessation of client device sensor data transmission corresponding to a client device battery state that is at or below a battery state threshold. In some such examples, a client device battery state that is at or below a first battery state threshold may cause a reduction of client device sensor data transmission data and a client device battery state that is at or below a second battery state threshold may cause a cessation of client device sensor data transmission. In one such example, the first battery state threshold may be a 20% battery charge level, a 25% battery charge level, a 30% battery charge level, etc., and the second battery state threshold may be a 5% battery charge level, a 10% battery charge level, a 15% battery charge level, etc.

In some examples, the control system may be configured to interpret first sensor data received from a first client device—such as the client device A of FIG. 2—based, at least in part, on second sensor data received from a second client device, such as the client device B of FIG. 2. Alternatively, or additionally, in some examples the control system may be configured to interpret the first sensor data according to sensor data—or other data—obtained by the device that includes the control system (such as the server device A of FIG. 2).

According to some examples, the control system may be configured to estimate a usage context of the first client device based, at least in part, on the second sensor data. The second sensor data may include location data, microphone data, temperature data, inertial sensor data, wireless signal type data, magnetometer data, cardiac-related data (such as PPG data), respiratory-related data, or combinations thereof. In some examples, the control system may be configured to estimate a usage context of the first client device based, at least in part, on first sensor data received from the first client device, on sensor data obtained by another device, or combinations thereof. In some examples, the usage context may be, or may include, an indoor context, an outdoor context, an urban context, a driving context, an activity context, an in-vehicle context, an ambient noise context, a human presence context, a location context, a speed context, a direction of motion context, an orientation context, an emergency context, or combinations thereof. In some such examples, the activity context may be, or may include, a walking context, a running context, a hiking context, a cycling context, a stair climbing context, a swimming context, a sports context, a communication context, or combinations thereof. In some examples, the communication context may be, or may include, an in-person talking context, an audio telephone call context, a video telephone call context, a texting context, a teleconferencing context, or combinations thereof.

In some examples, the control system may be configured to control the first client device based, at least in part, on sensor data received from a second client device, on sensor data received from another device, or combinations thereof. According to some such examples, the control system may be configured to control an audio mode of the first device based, at least in part, on the sensor data received from the second client device, or from another device. Some headphone and earbud examples are described above.

In some examples, the control system may be configured to combine first sensor data received from a first client device with second sensor data received from a second client device. Some sensor data fusion examples are described above.

According to some examples, the control system may be configured to determine whether first sensor data received from a first client device is more accurate than second sensor data received from a second client device. In some such examples, the control system may be configured to send calibration data to the second client device responsive to determining that the first sensor data is more accurate than the second sensor data received from a second client device.

For example, when a user is walking, hiking, running, etc., a server device (such as a smart phone) and a client device (such as a smart watch) may estimate step count, distance traveled, or both, at the same time. The devices may use different methods to estimate step count. For example, the smart phone may use foot strike detection and the smart watch may use arm swings to estimate steps taken. Accordingly, the two devices may determine different estimates of the distance traveled and even of the number of steps taken. A wearable exercise tracking device may not have GPS, for example, but a smart phone or a smart watch may have a GPS. Distance calibration information determined by a more accurate device—such as a GPS-enabled device—may be provided to a less accurate device. For example, server device A, which is GPS-enabled in this example, may transmit distance calibration information to client device B, which is a wearable exercise tracking device in this example. The distance calibration information may be transmitted at a time interval (such as every 5 minutes, every 10 minutes, etc.), at a distance interval (such as every kilometer, every mile, etc.), or combinations thereof. In some such examples, client device B may be configured to update one or more of its distance estimation algorithms according to the received distance calibration information.

According to some examples, the control system may be configured to estimate one or more cardiac parameters based on the sensor data from the one or more client devices. The cardiac parameters may be, or may involve, heart rate, blood pressure, or a combination thereof. The cardiac parameters may, in some examples, correspond with a range of desirable heart rates during exercise-related activities.

In some examples, the one or more client devices may be a single client device. In some such examples, the control system may be configured to provide offload processing responsive to an offload processing request received from the single client device. In one such example, if client device B includes one or more sensors relating to cardiac parameters, client device B may send an offload processing request to server A to estimate one or more cardiac parameters, as well as sensor data relating to the cardiac parameters. The sensor data may, for example, be PPG data, PAPG data, ultrasonic sensor data, etc.

Figure 4:
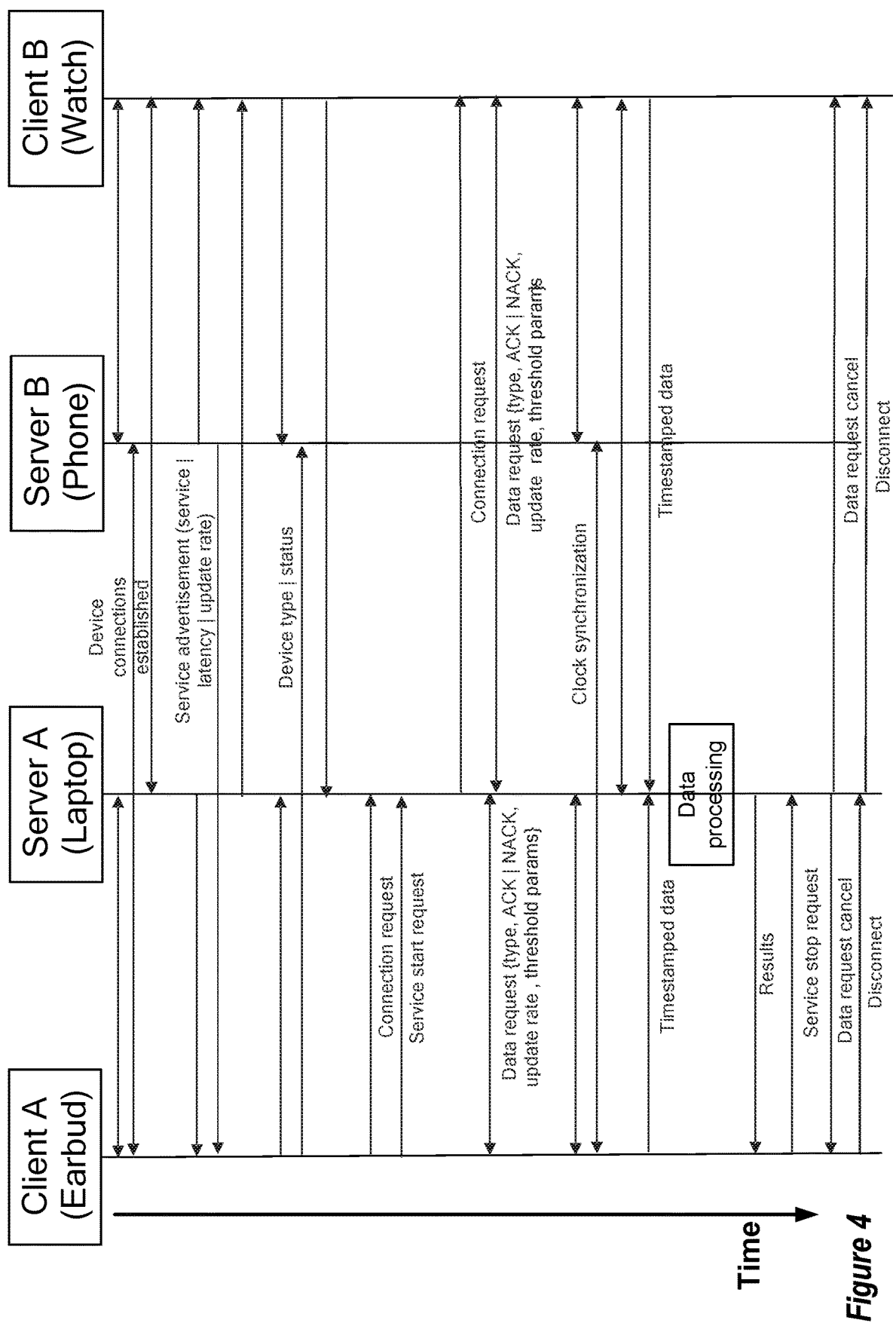
FIG. 4 shows examples of processes involving two server devices and two client devices.

FIG. 4 shows examples of processes involving two server devices and two client devices. In this example, client device A is an earbud, client device B is a smart watch, server device A is a laptop and server device B is a smart phone. In this example, time proceeds from the top of FIG. 4 towards the bottom, as indicated by the "time" arrow. As with other figures provided herein, the numbers, types and arrangements of elements shown in FIG. 4 are merely presented by way of example. Other implementations may include other numbers of elements, types of elements, arrangements of elements, or combinations thereof.

In this example, the first processes involve establishing device connections between server device A and client devices A and B, as well as establishing device connections between server device B and client devices A and B. In some examples, establishing device connections may involve device pairing, as the term "pairing" is used in the Bluetooth context, establishing one or more network connections, such as internet protocol (IP) or wireless local area network (LAN), via a broadcast method, etc.

According to this example, after device connections are established, server devices A and B advertise (broadcast) available processing services to client devices A and B, such as activity recognition, indoor/outdoor context determination, sound alert recognition, etc. In some such examples, server devices A and B may indicate factors such as latency, update rates, etc., for the available processing services.

In this example, client devices A and B then send client device information to server devices A and B. According to this example, the client device information indicates at least client device type information and client device sensor information. In this example, client device A then sends a connection request and a service start request to server device A. According to this example, server device A sends a connection request to client device B.

According to this example, server device A subsequently transmits sensor data request information to client devices A and B. The sensor data request information may indicate one or more requested sensor data types and one or more requested sensor data transmission parameters. The requested sensor data type(s) and parameters may be based, at least in part, on the client device information received from client devices A and B. The requested sensor data transmission parameters may, for example, indicate one or more threshold parameters for requested sensor data transmission, one or more update rate parameters, one or more variance parameters for requested sensor data transmission, or combinations thereof.

In this example, clock synchronization is maintained periodically between each client/server pair. In some examples, clock synchronization may be maintained via S4S, which is a proprietary Qualcomm standard, via Mobile Industry Processor Interface (MIPI) I3C Xtime, or by any other appropriate clock synchronization method, protocol, etc. Maintaining clock synchronization allows for sensor data from different devices to be meaningfully timestamped, so that such sensor data may be "fused."

Accordingly, in this example, client devices A and B send timestamped sensor data to server device A, pursuant to the sensor data request information previously received from server device A. In this example, server device A processes the timestamped sensor data from client devices A and B and returns corresponding results to client device A. The results may, for example, include results of an indoor-outdoor detection process, results of an activity recognition process, results of an in-vehicle detection process, head orientation data, calibration data, etc. In some examples, the server device A may provide one or more user prompts corresponding to the results of processing sensor data received from client devices A and B.

According to this example, client device A subsequently sends a service stop request to server device A. The service stop request may, for example be sent when the earbuds are in a low-battery state. In some such examples, a heart rate monitoring process, a spatial audio rendering process, etc., may be halted, so that the client device A does not need to use power sending corresponding data.

In this example, server device A subsequently sends a data request cancellation command to client devices A and B and disconnects from client devices A and B. A data request cancellation command and disconnection may, for example, be appropriate after service to client device A has been halted if server device A is not currently providing services to any other client device.

Implementation examples are described in the following numbered clauses:

1. An apparatus, including: an interface system including one or more interfaces configured for wireless communication with other devices; and a control system configured to: receive client device information from one or more client devices, the client device information indicating at least client device type information and client device sensor information; transmit sensor data request information to the one or more client devices, the sensor data request information indicating at least one or more requested sensor data types and one or more requested sensor data transmission parameters, the one or more requested sensor data transmission parameters indicating one or more threshold parameters for requested sensor data transmission, one or more variance parameters for requested sensor data transmission, or a combination thereof; and receive sensor data from the one or more client devices based, at least in part, on the one or more requested sensor data transmission parameters.

2. The apparatus of clause 1, where the one or more requested sensor data transmission parameters include one or more time-based parameters, one or more event-based parameters, or a combination thereof.

3. The apparatus of clause 1 or clause 2, where the one or more requested sensor data transmission parameters include one or more parameters corresponding to one or more client device battery states.

4. The apparatus of clause 3, where the one or more requested sensor data transmission parameters include parameters for reduction of client device sensor data transmission corresponding to a client device battery state that is at or below a battery state threshold.

5. The apparatus of clause 3, where the one or more requested sensor data transmission parameters include parameters for cessation of client device sensor data transmission corresponding to a client device battery state that is at or below a battery state threshold.

6. The apparatus of any one of clauses 1-5, where the one or more requested sensor data transmission parameters include one or more parameters involving a motion of a client device, an orientation of the client device, a position of the client device, whether the client device is being worn by a person, whether the client device is being carried by a person, or combinations thereof.

7. The apparatus of any one of clauses 1-6, where the control system is further configured to receive one or more sensor data transmission parameters, one or more battery state parameters, or a combination thereof, from the one or more client devices.

8. The apparatus of any one of clauses 1-7, where the one or more client devices include at least two client devices and where the sensor data are received from the at least two client devices.

9. The apparatus of clause 8, where the control system is further configured to interpret first sensor data received from a first client device based, at least in part, on second sensor data received from a second client device.

10. The apparatus of clause 9, where the control system is further configured to estimate a usage context of the first client device based, at least in part, on the second sensor data.

11. The apparatus of clause 10, where the usage context comprises an indoor context, an outdoor context, an urban context, a driving context, an activity context, an in-vehicle context, an ambient noise context, a human presence context, a location context, a speed context, a direction of motion context, an orientation context, an emergency context, or combinations thereof.

12. The apparatus of clause 11, where the usage context involves an activity context and where the activity context comprises a walking context, a running context, a hiking context, a cycling context, a stair climbing context, a swimming context, a sports context, a communication context, or combinations thereof.

13. The apparatus of clause 12, where the usage context involves a communication context and where the communication context comprises an in-person talking context, an audio telephone call context, a video telephone call context, a texting context, a teleconferencing context, or combinations thereof.

14. The apparatus of any one of clauses 10-13, where the control system is further configured to estimate the usage context of the first client device based, at least in part, on first sensor data received from the first client device.

15. The apparatus of any one of clauses 9-14, where the second sensor data includes location data, microphone data, temperature data, inertial sensor data, wireless signal type data, magnetometer data, cardiac data, respiratory data, or combinations thereof.

16. The apparatus of any one of clauses 8-15, where the control system is further configured to control the first client device based, at least in part, on sensor data received from a second client device.

17. The apparatus of clause 16, where the control system is further configured to control an audio mode of the first device based, at least in part, on the sensor data received from the second client device.

18. The apparatus of any one of clauses 8-17, where the control system is further configured to determine whether first sensor data received from a first client device is more accurate than second sensor data received from a second client device.

19. The apparatus of clause 18, where the control system is further configured to send calibration data to the second client device responsive to determining that the first sensor data is more accurate than the second sensor data received from a second client device.

20. The apparatus of any one of clauses 8-19, where the control system is further configured to combine first sensor data received from a first client device with second sensor data received from a second client device.

21. The apparatus of any one of clauses 1-20, where the control system is further configured to estimate one or more cardiac parameters based on the sensor data from the one or more client devices.

22. The apparatus of any one of clauses 1-21, where the one or more client devices include a single client device and where the control system is configured to provide offload processing responsive to an offload processing request received from the single client device.

23. A method, including: receiving, by a control system, client device information from one or more client devices, the client device information indicating at least client device type information and client device sensor information; transmitting, by the control system, sensor data request information to the one or more client devices, the sensor data request information indicating at least one or more requested sensor data types and one or more requested sensor data transmission parameters, the one or more requested sensor data transmission parameters indicating one or more threshold parameters for requested sensor data transmission, one or more variance parameters for requested sensor data transmission, or a combination thereof; and receiving, by the control system, sensor data from the one or more client devices based, at least in part, on the one or more requested sensor data transmission parameters.

24. The method of clause 23, where the one or more requested sensor data transmission parameters include one or more time-based parameters, one or more event-based parameters, or a combination thereof.

25. The method of clause 23 or clause 24, where the one or more requested sensor data transmission parameters include one or more parameters corresponding to one or more client device battery states.

26. The method of clause 25, where the one or more requested sensor data transmission parameters include parameters for reduction of client device sensor data transmission corresponding to a client device battery state that is at or below a battery state threshold.

27. The method of clause 25, where the one or more requested sensor data transmission parameters include parameters for cessation of client device sensor data transmission corresponding to a client device battery state that is at or below a battery state threshold.

28. An apparatus, including: an interface system including one or more interfaces configured for wireless communication with other devices; and control means for: receiving client device information from one or more client devices, the client device information indicating at least client device type information and client device sensor information; transmitting sensor data request information to the one or more client devices, the sensor data request information indicating at least one or more requested sensor data types and one or more requested sensor data transmission parameters, the one or more requested sensor data transmission parameters indicating one or more threshold parameters for requested sensor data transmission, one or more variance parameters for requested sensor data transmission, or a combination thereof; and receiving sensor data from the one or more client devices based, at least in part, on the one or more requested sensor data transmission parameters.

29. The apparatus of clause 28, where the one or more requested sensor data transmission parameters include one or more time-based parameters, one or more event-based parameters, or a combination thereof.

30. The apparatus of clause 28 or clause 29, where the one or more requested sensor data transmission parameters include one or more parameters corresponding to one or more client device battery states.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

Various modifications to the implementations described in this disclosure may be readily apparent to those skilled in the art, and the generic principles defined herein may be applied to other implementations without departing from the spirit or scope of this disclosure. Thus, the following claims are not intended to be limited to the implementations shown herein, but are to be accorded the widest scope consistent with this disclosure, the principles and the novel features disclosed herein.

Additionally, certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. Moreover, various ones of the described and illustrated operations can itself include and collectively refer to a number of sub-operations. For example, each of the operations described above can itself involve the execution of a process or algorithm. Furthermore, various ones of the described and illustrated operations can be combined or performed in parallel in some implementations. Similarly, the separation of various system components in the implementations described above should not be understood as requiring such separation in all implementations. As such, other implementations are within the scope of the following claims. In some cases, the actions recited in the claims can be performed in a different order and still achieve desirable results.

What is claimed is:

1. An apparatus, comprising:
an interface system including one or more interfaces configured for wireless communication with other devices; and
a control system configured to:
receive client device information from one or more client devices, the client device information indicating at least client device type information and client device sensor information;
transmit sensor data request information to the one or more client devices, the sensor data request information indicating at least one or more requested sensor data types and one or more requested sensor data transmission parameters, the one or more requested sensor data transmission parameters indicating one or more threshold parameters for requested sensor data transmission, wherein the one or more threshold parameters include one or more parameters corresponding to user activity types and associated frequencies of sensor data transmission; and receive sensor data from the one or more client devices based, at least in part, on the one or more requested sensor data transmission parameters.

2. The apparatus of claim 1, wherein the one or more requested sensor data transmission parameters include one or more time-based parameters, one or more event-based parameters, or a combination thereof.

3. The apparatus of claim 1, wherein the one or more requested sensor data transmission parameters include one or more parameters corresponding to one or more client device battery states.

4. The apparatus of claim 3, wherein the one or more requested sensor data transmission parameters include parameters for reduction of client device sensor data transmission corresponding to a client device battery state that is at or below a battery state threshold.

5. The apparatus of claim 3, wherein the one or more requested sensor data transmission parameters include parameters for cessation of client device sensor data transmission corresponding to a client device battery state that is at or below a battery state threshold.

6. The apparatus of claim 1, wherein the one or more requested sensor data transmission parameters include one or more parameters involving a motion of a client device, an orientation of the client device, a position of the client device, whether the client device is being worn by a person, whether the client device is being carried by a person, or combinations thereof.

7. The apparatus of claim 1, wherein the control system is further configured to receive one or more sensor data transmission parameters, one or more battery state parameters, or a combination thereof, from the one or more client devices.

8. The apparatus of claim 1, wherein the one or more client devices include at least two client devices and wherein the sensor data are received from the at least two client devices.

9. The apparatus of claim 8, wherein the control system is further configured to interpret first sensor data received from a first client device based, at least in part, on second sensor data received from a second client device.

10. The apparatus of claim 9, wherein the control system is further configured to estimate a usage context of the first client device based, at least in part, on the second sensor data.

11. The apparatus of claim 10, wherein the usage context comprises an indoor context, an outdoor context, an urban context, a driving context, an activity context, an in-vehicle context, an ambient noise context, a human presence context, a location context, a speed context, a direction of motion context, an orientation context, an emergency context, or combinations thereof.

12. The apparatus of claim 11, wherein the usage context involves an activity context and wherein the activity context comprises a walking context, a running context, a hiking context, a cycling context, a stair climbing context, a swimming context, a sports context, a communication context, or combinations thereof.

13. The apparatus of claim 12, wherein the usage context involves a communication context and wherein the communication context comprises an in-person talking context, an audio telephone call context, a video telephone call context, a texting context, a teleconferencing context, or combinations thereof.

14. The apparatus of claim 10, wherein the control system is further configured to estimate the usage context of the first client device based, at least in part, on first sensor data received from the first client device.

15. The apparatus of claim 9, wherein the second sensor data includes location data, microphone data, temperature data, inertial sensor data, wireless signal type data, magnetometer data, cardiac data, respiratory data, or combinations thereof.

16. The apparatus of claim 8, wherein the control system is further configured to control the first client device based, at least in part, on sensor data received from a second client device.

17. The apparatus of claim 16, wherein the control system is further configured to control an audio mode of the first device based, at least in part, on the sensor data received from the second client device.

18. The apparatus of claim 8, wherein the control system is further configured to determine whether first sensor data received from a first client device is more accurate than second sensor data received from a second client device.

19. The apparatus of claim 18, wherein the control system is further configured to send calibration data to the second client device responsive to determining that the first sensor data is more accurate than the second sensor data received from a second client device.

20. The apparatus of claim 8, wherein the control system is further configured to combine first sensor data received from a first client device with second sensor data received from a second client device.

21. The apparatus of claim 1, wherein the control system is further configured to estimate one or more cardiac parameters based on the sensor data from the one or more client devices.

22. The apparatus of claim 1, wherein the one or more client devices include a single client device and wherein the control system is configured to provide offload processing responsive to an offload processing request received from the single client device.

23. A method, comprising:
receiving, by a control system, client device information from at least two client devices, the client device information indicating at least client device type information and client device sensor information;
transmitting, by the control system, sensor data request information to the at least two client devices, the sensor data request information indicating at least one or more requested sensor data types and one or more requested sensor data transmission parameters, the one or more requested sensor data transmission parameters indicating one or more threshold parameters for requested sensor data transmission, one or more variance parameters for requested sensor data transmission, or a combination thereof;
receiving, by the control system, sensor data from the at least two client devices based, at least in part, on the one or more requested sensor data transmission parameters;
determining whether first sensor data received from a first client device is more accurate than second sensor data received from a second client device; and
responsive to determining that the first sensor data is more accurate than the second sensor data, sending calibration data to the second client device, the calibration data including updates to increase the accuracy of the second sensor data.

24. The method of claim 23, wherein the one or more requested sensor data transmission parameters include one or more time-based parameters, one or more event-based parameters, or a combination thereof.

25. The method of claim 23, wherein the one or more requested sensor data transmission parameters include one or more parameters corresponding to one or more client device battery states.

26. The method of claim 25, wherein the one or more requested sensor data transmission parameters include parameters for reduction of client device sensor data transmission corresponding to a client device battery state that is at or below a battery state threshold.

27. The method of claim 25, wherein the one or more requested sensor data transmission parameters include parameters for cessation of client device sensor data transmission corresponding to a client device battery state that is at or below a battery state threshold.

28. An apparatus, comprising:
an interface system including one or more interfaces configured for wireless communication with other devices; and
control means for:
receiving client device information from one or more client devices, the client device information indicating at least client device type information and client device sensor information;
transmitting sensor data request information to the one or more client devices, the sensor data request information indicating at least one or more requested sensor data types and one or more requested sensor data transmission parameters, the one or more requested sensor data transmission parameters indicating one or more threshold parameters for requested sensor data transmission, wherein the one or more threshold parameters include one or more parameters corresponding to user activity types and associated frequencies of sensor data transmission; and
receiving sensor data from the one or more client devices based, at least in part, on the one or more requested sensor data transmission parameters.

29. The apparatus of claim 28, wherein the one or more requested sensor data transmission parameters include one or more time-based parameters, one or more event-based parameters, or a combination thereof.

30. The apparatus of claim 28, wherein the one or more requested sensor data transmission parameters include one or more parameters corresponding to one or more client device battery states.

* * * * *